United States Patent [19]

O'Donnell et al.

[11] Patent Number: 6,088,472
[45] Date of Patent: *Jul. 11, 2000

[54] GLOBAL MODELS WITH PARAMETRIC OFFSETS FOR OBJECT RECOVERY

[75] Inventors: Thomas O'Donnell, Englewood, N.J.;
Terrance E. Boult, Bethlehem, Pa.;
Alok Gupta, East Brunswick, N.J.

[73] Assignee: Siemens Corporate Research, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/770,963

[22] Filed: Dec. 20, 1996

[51] Int. Cl.$^7$ ........................................................ G06K 9/00
[52] U.S. Cl. ................................. 382/128; 382/293
[58] Field of Search ........................ 382/128, 107, 382/131, 132, 266, 276, 130, 153, 154, 181, 190, 191, 192, 195, 196, 197, 199, 201, 203, 204, 209, 217, 218, 224, 241, 242, 243, 254, 260, 286, 278, 282, 307, 308, 293, 103, 106, 108, 133, 134, 173; 378/98.5; 701/215, 226; 600/416, 437, 443; 342/358, 357; 348/409

[56] References Cited

U.S. PATENT DOCUMENTS

| 5,259,040 | 11/1993 | Hanna | 382/41 |
| 5,323,322 | 6/1994 | Mueller et al. | 364/449 |
| 5,435,310 | 7/1995 | Sheehan et al. | 128/653.1 |
| 5,570,430 | 10/1996 | Sheehan et al. | 382/128 |

OTHER PUBLICATIONS

"The Use of Hybrid Models to Recover Cardiac Wall Motion in Tagged MR Images", Funica–Lea et al., 1996, IEEE, Simens Corp. Research, Princeton, NJ, (No Place of Publications, No Date)—pp. #S:625–630.

"From Global to Local, a Continuum of Shape Models With Fractal Priors", Vemuri et al., (No Date, Place of Publications), pp.:307–313.

"Dynamic 3D Models With Local & Global Deformations–Deformable Superquadrics", Terzopoulos et al., Trans. on Pattern Analysis, vol. 13, No. 7, Jul. 1991, pp. 703–714.

*Primary Examiner*—Bijan Tadayon

[57] ABSTRACT

A system for analyzing motion contains an overall model that includes local deformations and a scaleable default model having a global component and parametric offsets. The offsets provide two features. First, they help to form an expected model shape which facilitates appropriate model data correspondences. Second, they scale with the global component to maintain the expected shape even in the presence of large global deformations. The system is applied to the recovery of a 3-D object from a volunteer dataset of tagged images.

21 Claims, 6 Drawing Sheets

GLOBAL MODELS WITH PARAMETRIC OFFSETS FOR OBJECT RECOVERY

This patent application is related to copending U.S. patent application Ser. No. 08/724,698 entitled A Cardiac Motion Recovery System, filed on Sep. 30, 1996, and assigned to the same assignees as the present invention.

BACKGROUND OF THE INVENTION

1. Field of the Invention

The present invention relates to the recovery of objects of any dimension using global models with parametric offsets. This recovery formulation allows for the creation of scalable default models which help to constrain the model fit in expected ways as well as aid in the assignment of model-data correspondences.

2. Description of the Prior Art

Different forms of hybrid models have been described in vision literature over the past several years. The following will focus only on those models most closely related to the present invention. In the models related to the present invention, the global component has been described by a parametric model or as a series of vibrational modes. Parametric models are described by D. Terzopoulos and D. Metaxas in "Dynamic 3D Models With Local And Global Deformations: Deformable Superquadrics", *IEEE PAMI*, 13(7):703–714, 1991; by J. Park, D. Metaxas and L. Axel in "Volumetric Deformable Models With Parametric Functions: A New Approach To The 3D Motion Analysis Of The LV From MRI-SPAMM", *Proceedings of the 5th IEEE ICCV*, MIT, Mass., pages 700–705, 1995; and by J. Park, D. Metaxas and A. Young in "Deformable Models With Parameter Functions: Application To Heart Wall Modeling", *Proceedings of the IEEE CVPR*, Seattle, Wash., pages 437–442, 1994. Vibrational modes are described by A. Pentland in "The Thingworld Modeling System: Virtual Sculpting By Modal Forces", *Proceedings of SIGGRAPH*, pages 143–144, 1990; and by B. C. Vemuri and A. Radisavljevic in "From Global To Local, A Continuum Of Shape Models With Fractal Priors", *IEEE CVPR*, pages 307–313, 1993.

A. Pentland and J. Williams in "Good Vibrations: Modal Dynamics For Graphics And Animation", *Computer Graphics*, 23(3):215–222, July 1989, presented the first use of hybrid modeling in the programming environment, ThingWorld. The system coupled a global geometric modal representation with a local description of the object's dynamics.

Terzopoulos and Metaxas included a global superquadric component in their deformable model. The deformations from this base superquadric model take the form of a thin membrane spline described using the Finite Element Method (FEM). Unlike Pentland's model, the underlying superquadric as well as the spline mesh deformed to fit the data.

Park, Metaxas and Young developed a thick ellipsoidal model for recovering 3-D cardiac motion from tagged-MR data. Their model, developed independently and in parallel with T. O'Donnell, A. Gupta and T. Boult in "The Hybrid Volumetric Ventriculoid: A Model For MR-SPAMM 3-D Analysis", *Proceedings of Computers in Cardiology, IEEE*, 1995, provided a piecewise plot of the change in relevant global LV characteristics. Their model, however, does not report strain and is recovered under the unrealistic assumption that the tag columns remain straight over the cardiac cycle. Their model formulation differs from the model formulation of the present invention in the following ways. First, their model does not have distinct global and local components. They use linear piecewise parametric functions to express local deformations. Second, the default shape of the model is a thick ellipsoid rather than a shape closer to a real LV. Third, their model does not provide a concise description of the LV movement. Rather, piecewise plots describe the motion. Fourth, their model assumes a dense tag acquisition and therefore makes no use of "regularizing" constraints.

As compared to the HVV, there is a clear distinction between global and offset components in this model, it differs from the approach of the present invention in that the offsets are not parametric.

SUMMARY OF THE INVENTION

The present invention is a new shape model formulation that includes built-in offsets from a base global component (e.g. an ellipsoid) which are functions of the global component's parameters. The offsets provide two features. First, they help to form an expected model shape which facilitates appropriate model data correspondences. Second, they scale with the base global model to maintain the expected shape even in the presence of large global deformations.

The input to the model formulation are images. This data with the parametric offsets and the global component provide a scaleable default model. An input of motion information images with the scaleable default model and local deformations provide an overall model builder. The output of the model formulation is an analysis of motion.

To illustrate this formulation an instance of a solid-walled ellipsoid is provided. It should be reiterated that the present invention may be applied to any shape model of any dimension.

DETAILED DESCRIPTION OF THE INVENTION

Figure 1:
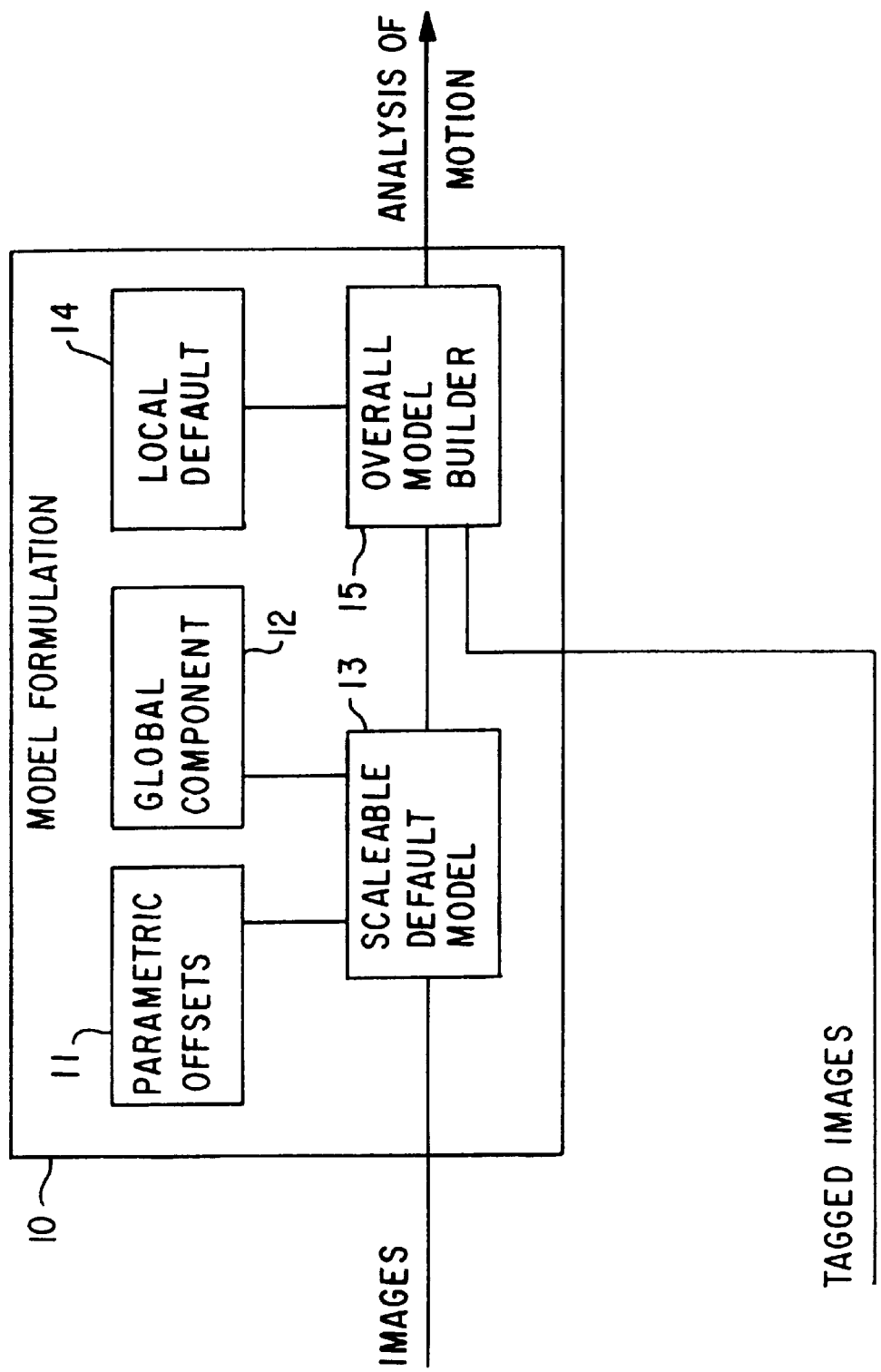
FIG. 1 illustrates a block diagram of the present invention.

FIG. 1 illustrates a block diagram of the present invention which includes model formulation 10, a global model with parametric offsets. Model formulation 10 is capable of describing an expected (or default) configuration which facilitates appropriate model scaling as well as proper model-data correspondences. Model formulation 10 may be considered a type of hybrid model in that it is an amalgam of a global (parametric) model and a local (spline-like) model. A thick ellipsoid model was selected as an example instantiation in order to demonstrate the application of the fitting process to a useful domain, that of modeling the left ventrical (LV) of the heart.

The input to model formulation 10 are images. This data with parametric offsets 11 and global component 12 provide a scaleable default model 13. An input of tagged images with scaleable default model 13 and local deformations 14 provide overall model builder 15. The output of model formulation 10 is an analysis of motion.

As a form of hybrid model, global models with parametric offsets have a twofold goal in recovery. First, to extract from a data set a gross description of the shape and movement for comparison and classification via global parameters. Second, to retain a detailed description of the data for geometric measurements such as surface area and material strain. This is made possible through "displacements" from a globally scaleable default shape. The model form of the present invention is distinguished by the incorporation of scaleable (parametric) offsets in the default shape.

Figure 2A:
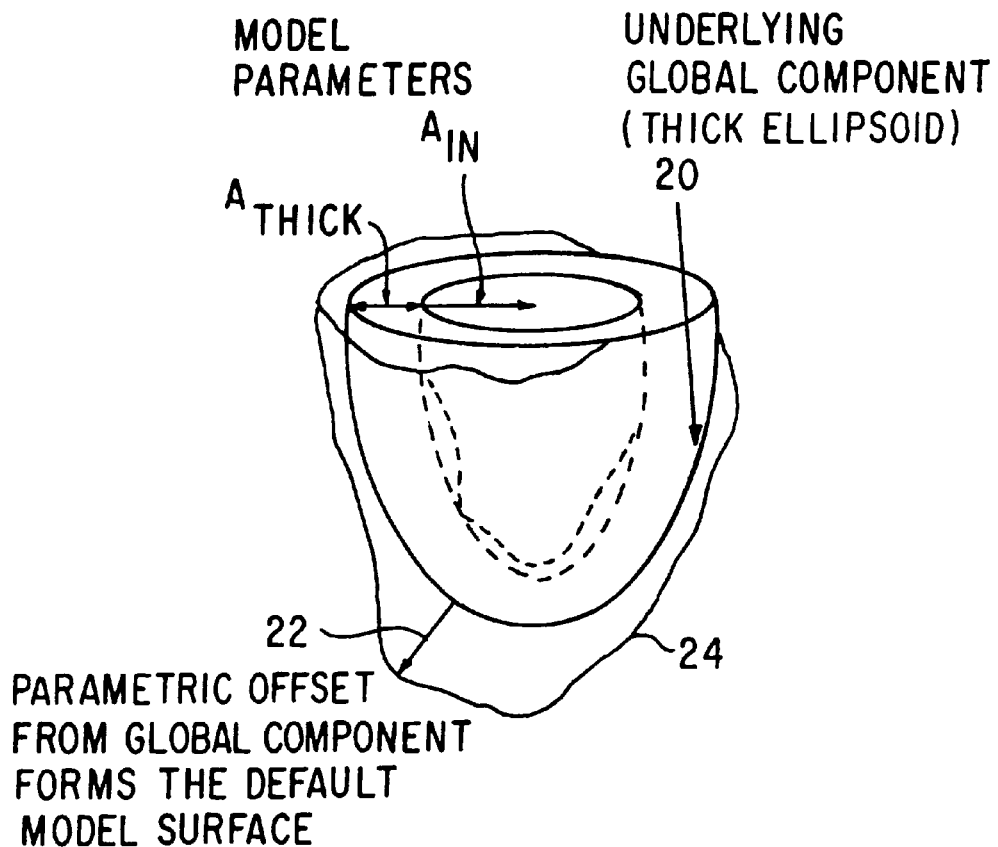
FIGS. 2a and 2b illustrate model formulation which is made up of three components. The base global model and parametric offsets are shown in FIG. 2a and local deformations forming the overall model are shown in FIG. 2b.
Figure 2B:
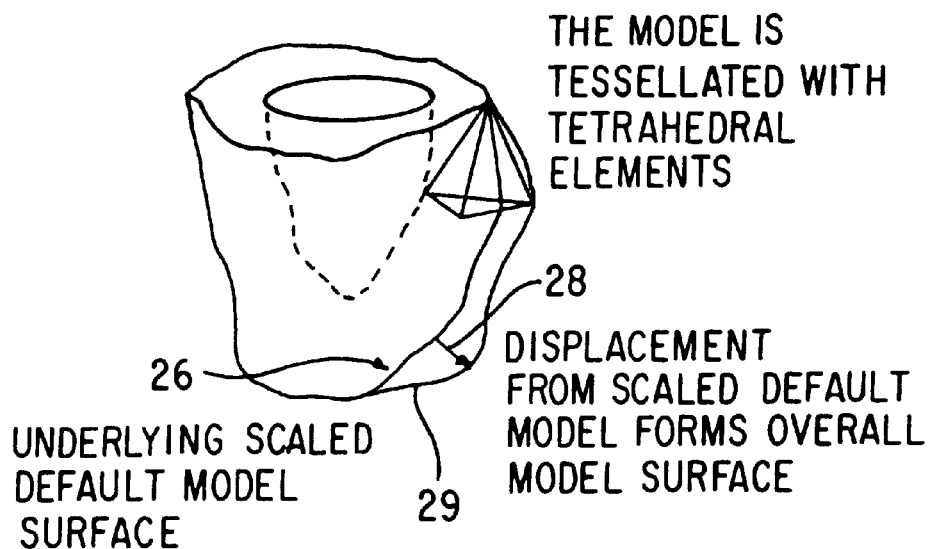

The model formulation of the present invention is made up of three components; base global model, parametric offsets, and local deformations. This is illustrated in FIGS. 2a and 2b. From FIG. 2a, the base global model 20 and parametric offsets 22 form the scaleable default model 24. From FIG. 2b, the scaled default model 26 plus local deformations 28 form the overall model 29. The local deformations tailor a scaled default model to a specific dataset. The length and direction of the local deformations are not parametric. More concisely, Scaleable Default Model = Global Component | Parametric Offsets Overall Model = Scaleable Default Model + Local Deformations The local deformations are used to tailor the scaled default model to a specific dataset. The following will describe each component in detail using the solid walled ellipsoid as an example A point c(x,y,z) on the global component is described by $x(u,v,\alpha)=a_1(\alpha)\cos(u)\cos(v)$
$y(u,v,\alpha)=a_2(\alpha)\cos(u)\sin(v)$
$z(u,\alpha)=a_3(\alpha)\sin(u)$ $$0 \leq u \leq \pi/2, -\pi \leq v \leq \pi, \quad (1)$$

where the parameters, $$a_i(\alpha)=a_{i_{inner}}(1-\alpha)+a_{i_{outer}}\alpha \quad (2)$$

for i={1,2,3}, are defined as functions of the wall radii. At $\alpha=0$ and 1 the model describes the inner walls and outer walls respectively.

The global component of the present invention is augmented with tapering (along the x and y axes), bending and twisting using the variations of these formulations described by D. Terzopoulos and D. Metaxas. The twisting of the inner and outer walls are controlled by independent parameters, $twist_{inner}$ and $twist_{outer}$, in a fashion similar to Equation 2.

Parametric offsets (from the global component) are introduced to the standard hybrid model formulation in order to create a default or "rest" shape which resembles the object undergoing recovery. Thus, regions where data is sparse are more likely to be estimated correctly. The inclusion results in a significantly more accurate default shape than could be modeled with the implicit parametric global component alone even with its global deformations (e.g., bending). And, it is possible to describe this complex shape with a very few parameters.

Figure 3:
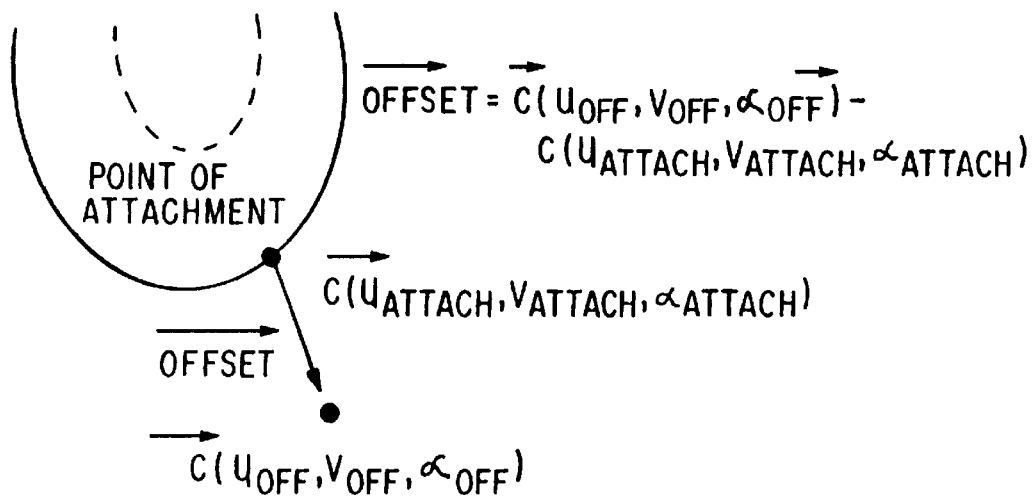
FIG. 3 illustrates calculation of parametric offset vectors.

In all other hybrid model formulations which include what may be thought of as offsets, the offsets are described simply by a Cartesian vector (the "offset vector") and a point of attachment to the base global model. Parametric offsets, on the other hand, are described by a set of intrinsic parameter values with associated points of attachment. In the case of the thick ellipsoid model described above, parametric offsets are a trio ($u_{off}$, $v_{off}$, $\alpha_{off}$) plus a point of attachment. The offset vector itself is calculated by evaluating the base global model (Equation 1) at ($u_{off}$, $v_{off}$, $\alpha_{off}$), and taking the vector difference with the point of attachment ($u_{attach}$, $v_{attach}$, $\alpha_{attach}$). This is illustrated in FIG. 3.

Note that when fitting to a specific dataset, these values will have already been calculated and fixed. While the values are fixed, the offset vectors scale with the base global model's extrinsic parameters. Following this route allows for the scaling of a complex default model appropriately. Below, parametric offsets with non-parametric offsets will be compared.

Calculation of the values ($u_{off}$, $v_{off}$, $\alpha_{off}$) is performed on a dataset describing a typical instance or average of instances of the type of object likely to be recovered. The values are found in the direction of the gradient $$((\partial c(u_{off}, v_{off}, \alpha_{off})/\partial u_{off}), (\partial c(u_{off}, v_{off}, \alpha_{off})/\partial v_{off}), (\partial c(u_{off}, v_{off}, \alpha_{off})/\partial \alpha_{off}))$$

Figure 4A:
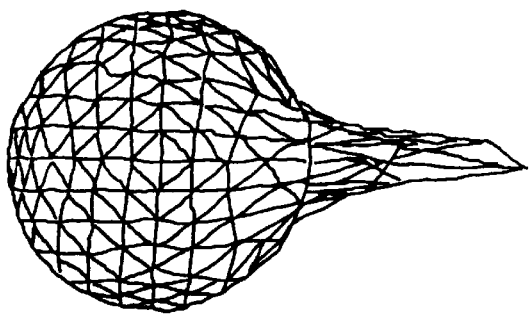
FIGS. 4a, 4b and 4c illustrate a spherical model with offsets, a radially scaled model with parametric offsets and a radially scaled model with non-parametric offsets respectively.
Figure 4B:
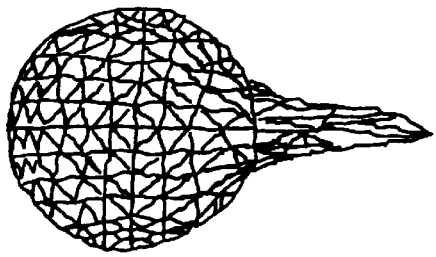
Figure 4C:
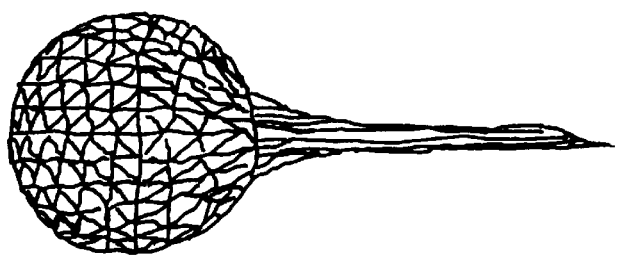

The following will discuss parametric vs non-parametric offsets. Non-parametric offsets were introduced to the hybrid modeling paradigm by O'Donnell, Gupta, and Boult. Since the non-parametric offsets do not scale, the default shape may become extremely distorted as the base global model deforms. This is illustrated in FIGS. 4a, 4b and 4c. FIG. 4a illustrates a spherical model with offsets. FIG. 4b illustrates a radially scaled model with parametric offsets. Note that the overall structure of the model is preserved. FIG. 4c illustrates a radially scaled model with non-parametric offsets. The offsets remain fixed as the global parameters change, resulting in a distorted shape. Note that the scaling demonstrated in this figure could have been implemented as a simple uniform scaling of space. However, global models with parametric offsets are capable of much more sophisticated adjustments.

Figure 5A:
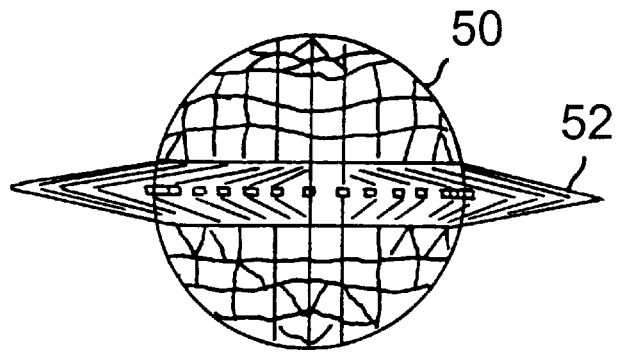
FIGS. 5a, 5b and 5c illustrate an original model, a globally twisted model with parametric offsets and a globally twisted model with non-parametric offsets respectively.
Figure 5B:
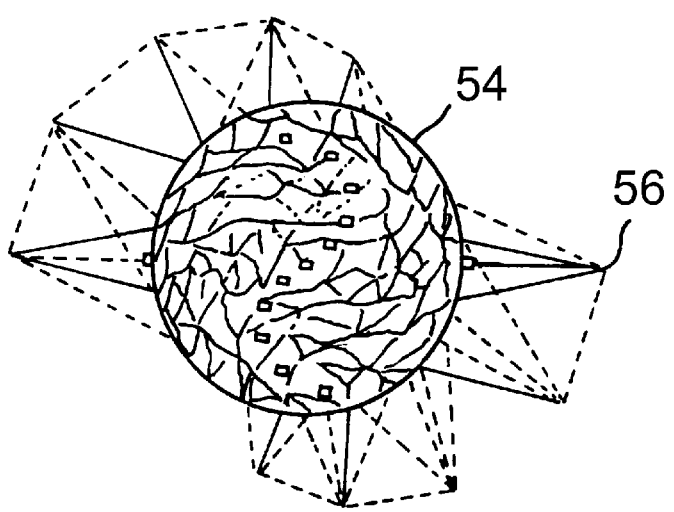
Figure 5C:
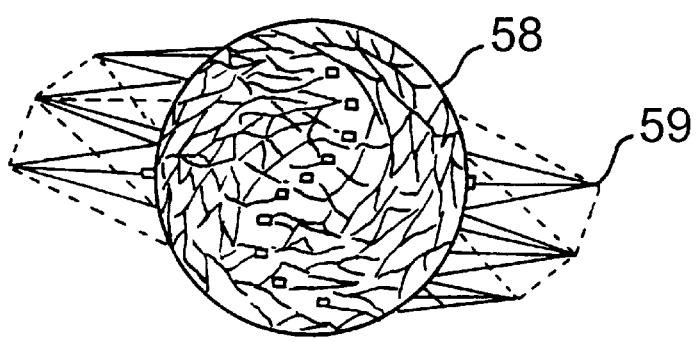

FIGS. 5a, 5b and 5c show an example of such an adjustment. FIG. 5a illustrates an original model having base global model 50 and offsets 52. FIG. 5b illustrates a globally twisted model 54 with parametric offsets 56. The overall structure looks natural since the offsets adjust to the new base component shape. FIG. 5c illustrates a globally twisted model 58 with non-parametric offsets 59. The offsets do not adjust to the new global component configuration. In the case that the offsets are non-parametric they seem to lie nearly flat on the model in places. This is because although the position where they are attached to the model changes in space, the offsets remain the same Cartesian vectors in length and direction. The result is a non-intuitive shape. In the case where the offsets are parametric, they adjust to the new model attachment position. The resulting shape is more natural since the offsets are normal to the surface just as they were in the original configuration.

Local deformations are Cartesian vectors with a point of attachment to the default model. In other formulations they have typically been termed "displacements". This is described by D. Terzopoulos and D. Metaxas and by B. C. Vemuri and A. Radisavljevic. The term "local deformation" is employed in order to clearly distinguish them from offsets.

Local deformations come into play after the scaling of the default model to a specific dataset. The deformations are necessary to tailor the model to a specific dataset if the scaled default shape does not sufficiently approximate the data. Since local deformations cause the model to deviate from the expected shape (the default model), their presence may incur an optional fitting penalty.

Prior to the recovery from a specific dataset, a default model must be created. This may be done by fitting the base global model to a set of contour data and allowing the parametric offsets to deform. Since the initial model for these fits is the base global model, it may be necessary to edit the fitting by hand since proper model-data correspondences may not be made.

Recovery of a specific dataset is composed of two stages. First, the default model is applied to a dataset and allowed to scale. Following this, displacements are used to recover differences between the resulting scaled default model and the data. Model deformation at both stages follow the approach developed by D. Terzopoulos and D. Metaxas by minimizing the energy of the model-data system.

The utility of the present invention will now be demonstrated by recovering the 3-D motion of a human LV from tagged-MR data.

Figure 6:
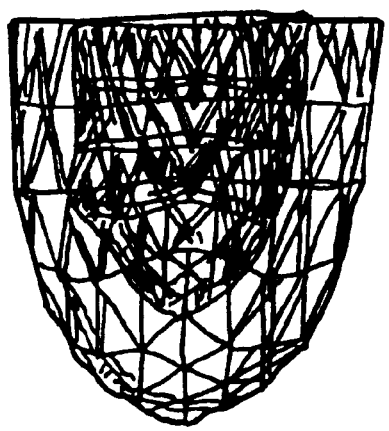
FIG. 6 illustrates the default LV model recovered using three different volunteer datasets.

The default LV model was recovered by fitting a base global model to a merged set of three segmented LV contour datasets. The datasets were from different volunteers and registered by hand using rigid-body rotations as well as scaling. All were from the ED phase of the cardiac cycle. Two contained short-axis information and one contained long axis information. Some minor editing of the fit was necessary. The results are shown in FIG. 6 which illustrates the default LV model recovered using three different volunteer datasets. The model is in the ED phase of the cardiac cycle.

The default model was applied to segmented tag intersections as described by G. Funka-Lea and A. Gupta in "The Use Of Hybrid Models To Recover Cardiac Wall Motion In Tagged MR Images", *IEEE CVPR*, 1996, extracted from long and short axis images. All images were acquired on a Siemens MAGNETOM Vision 1.5 T MRI system with a standard 25 mT/m gradient system. An ECG triggered 2-D gradient echo cine pulse sequence with velocity compensation was utilized. In-plane resolution was 1.74*1.17 mm and slice thickness was 10 mm. The tag grid was applied within 20 msec immediately following the R-wave trigger. The tags were 2 mm wide and spaced 9 mm apart. Six cardiac phases were acquired, covering from ED to ES with 60 msec. temporal resolution. Identical imaging parameters were used for the long-axis and short-axis acquisitions.

Figure 7A:
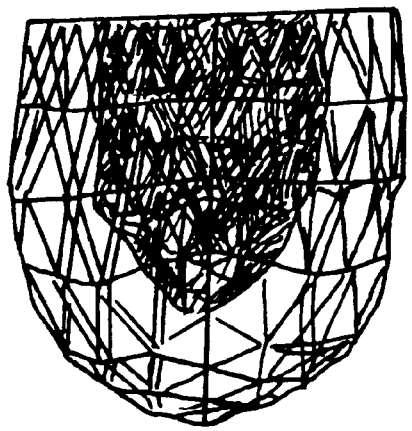
FIGS. 7a and 7b illustrate final fits to volunteer data for the ED and ES phases respectively.
Figure 7B:
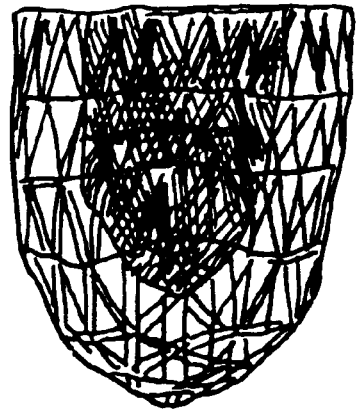

The results of fitting the models to the data are shown for ED and ES in FIGS. 7a and 7b and Table 1. FIGS. 7a and 7b illustrate final fits to volunteer data for the ED (FIG. 7a) and ES (FIG. 7b) phases.

TABLE 1

| Param | Meaning | ED | ES |
| --- | --- | --- | --- |
| $a1_{inner}$ | Endocardial rad | 2.66 cm | 2.58 cm |
| $a1_{outer}$ | Epicardial Wall | 4.81 cm | 4.82 cm |

TABLE 1-continued

| Param | Meaning | ED | ES |
| --- | --- | --- | --- |
| $a3_{inner}$ | Apex to base | 6.64 cm | 6.41 cm |
| $taper_x$ | X-axis Tapering | −0.21 cm | −0.11 cm. |
| $twist_{inner}$ | Endocardial twist | 0.00 | 0.016 |

Figure 8:
FIG. 8 illustrates the eigenvalues of the principle components of the strain tensor of the LV at end systole.

Strain was found to be much higher closer to the base of the LV with an average eigenvalue corresponding to the principle component of strain of 1.20 as compared with 0.93 towards the apex. This is illustrated in FIG. 8 which is a display of the eigenvalues of the principle components of the strain tensor of the LV at end systole. The dark regions represent regions of low strain and the light regions represent regions of high strain. The average RMS error of the tag intersection displacements was found to be 0.83 mm and the decrease in volume from ED to ES was 9%.

From the above, it has been shown that the inclusion of parametric offsets can aid in object recovery by creating a default model shape more expressive and more easily scaled than hybrid model formulations of the prior art. The new model form was tested on the recovery of 3-D strain and motion from a tagged-MR acquisition.

It is not intended that the present invention be limited to the hardware or software arrangement, or operational procedures shown disclosed. This invention includes all of the alterations and variations thereto as encompassed within the scope of the claims as follows.

We claim:

1. A global model system, comprising;
   an overall model builder for receiving specific motion information images;
   local deformations; and
   a scalable default mode, comprising:
      a global component, and
      parametric offsets, comprising:
         a trio of offset values ($u_{off}$, $v_{off}$, $\alpha_{off}$) plus a point of attachment ($u_{attach}$, $v_{attach}$, $\alpha_{attach}$) to said global component and an offset vector calculated by evaluating said global component at ($u_{off}$, $v_{off}$, $\alpha_{off}$), and taking a vector difference with said point of attachment ($u_{attach}$, $v_{attach}$, $\alpha_{attach}$), wherein said global component is fitted to the information images, to deform the scalable default model while maintaining an overall expected shape based on the scalable default model, by changing the global component via parameters corresponding thereto in accordance with the received images, and maintaining the trio of offset values corresponding to said parametric offsets.

2. A global model system as claimed in claim 1 wherein said overall model comprises:
   extraction means for extracting from a data set a gross description of shape and movement for comparison and classification via global parameters; and,
   retention means for retaining a detailed description of data for geometric measurements.

3. A global model system as claimed in claim 1 wherein: said overall model is capable of describing an expected configuration which facilitates appropriate model scaling as well as proper model-data correspondences.

4. A global model system as claimed in claim 1 wherein: said overall model is implemented as a solid, thick-walled ellipsoid model.

5. A global model system as claimed in claim 1 wherein said overall model comprises:

fusion means for fusing acquisitions of an object taken from different views registered in time using a model-based approach.

6. A global model system as claimed in claim 1 wherein said local deformations comprise:

tailoring means for tailoring said scaleable default model to a specific dataset if scaled default shape does not approximate data.

7. A global model system as claimed in claim 1 wherein said parametric offsets comprise:

default means for creating a default shape which resembles an object undergoing recovery therefore regions where data is sparse are more likely to be estimated correctly.

8. A global model system as claimed in claim 1 wherein said parametric offsets comprise:

forming means for forming an expected model shape which facilitates appropriate model data correspondences; and, scaling means for scaling with said global component to maintain an expected shape even in a presence of large global deformations.

9. A global model system as claimed in claim 1 wherein:

said global component is augmented with tapering, bending and twisting using variations of formulations.

10. A method of providing a global model comprising the steps of:

receiving images;

deriving a scalable default model by utilizing parametric offsets and a global component, wherein said parametric offsets comprise:

a trio of offset values ($u_{off}$, $v_{off}$, $\alpha_{off}$) plus a point of attachment ($u_{attach}$, $v_{attach}$, $\alpha_{attach}$) to said global component and an offset vector calculated by evaluating said global component at ($u_{off}$, $v_{off}$, $\alpha_{off}$), and taking a vector difference with said point of attachment ($u_{attach}$, $v_{attach}$, $\alpha_{attach}$);

obtaining an overall model by utilizing local deformations;

providing analysis of motion; and fitting the global component to the images to deform the scalable default model while maintaining an overall expected shape based on the scalable default model, wherein said fitting step comprises the steps of:

changing the global component via parameters corresponding thereto in accordance with the received images;

maintaining the trio of offset values corresponding to said parametric offsets.

11. A method of providing a global model as claimed in claim 10 wherein obtaining an overall model comprises the steps of:

extracting from a data set a gross description of shape and movement for comparison and classification via global parameters; and, retaining a detailed description of data for geometric measurements.

12. A method of providing a global model as claimed in claim 10 wherein obtaining an overall model comprises the step of:

describing an expected configuration which facilitates appropriate model scaling as well as proper model-data correspondence.

13. A method of providing a global model as claimed in claim 10 wherein obtaining an overall model comprises the step of:

fusing acquisitions of an object taken from different views registered in time using a model-based approach.

14. A method of providing a global model as claimed in claim 10 wherein obtaining an overall model by utilizing local deformations comprises the step of:

tailoring said scaleable default model to a specific dataset if scaled default shape does not approximate data.

15. A method of providing a global model comprising the steps of:

receiving images;

deriving a scalable default model by utilizing parametric offsets and a global component, wherein said parametric offsets comprise:

a trio of offset values ($u_{off}$, $v_{off}$, $\alpha_{off}$) plus a point of attachment ($u_{attach}$, $v_{attach}$, $\alpha_{attach}$) to said global component and an offset vector calculated by evaluating said global component at ($u_{off}$, $v_{off}$, $\alpha_{off}$), and taking a vector difference with said point of attachment ($u_{attach}$, $v_{attach}$, $\alpha_{attach}$);

deriving an overall model builder for receiving specific tagged images;

utilizing local deformations;

providing an analysis of motion; and fitting the global component to the images to deform the scalable default model while maintaining an overall expected shape based on the scalable default model, wherein said fitting step comprises the steps of:

changing the global component via parameters corresponding thereto in accordance with the received images; and maintaining the trio of offset values corresponding to said parametric offsets.

16. A method of providing a global model as claimed in claim 15 wherein deriving an overall model builder comprises the steps of:

extracting from a data set a gross description of shape and movement for comparison and classification via global parameters; and, retaining a detailed description of data for geometric measurements.

17. A method of providing a global model as claimed in claim 15 wherein deriving an overall model builder comprises the step of:

describing an expected configuration which facilitates appropriate model scaling as well as proper model-data correspondence.

18. A method of providing a global model as claimed in claim 15 wherein deriving an overall model builder comprises the step of:

fusing acquisitions of an object taken from different views registered in time using a model-based approach.

19. A global model system as claimed in claim 2 wherein the geometric measurements include at least one of surface area and material strain.

20. A global model system as claimed in claim 11 wherein the geometric measurements include at least one of surface area and material strain.

21. A global model system as claimed in claim 16 wherein the geometric measurements include at least one of surface area and material strain.

* * * * *